United States Patent [19]

Ventimiglia

[11] Patent Number: 4,695,241

[45] Date of Patent: Sep. 22, 1987

[54] DIP MOLD AND PROCESS

[75] Inventor: Joseph J. Ventimiglia, St. Louis, Mo.

[73] Assignee: Sinclair and Rush, Inc., St. Louis, Mo.

[21] Appl. No.: 822,047

[22] Filed: Jan. 24, 1986

[51] Int. Cl.[4] ............................................. B28B 21/46
[52] U.S. Cl. .................................... 425/275; 264/301; 425/269; 425/270; 425/271; 425/812
[58] Field of Search ............... 425/269, 270, 271, 275, 425/812; 264/301, 304

[56] References Cited

FOREIGN PATENT DOCUMENTS 1112827  8/1961  Fed. Rep. of Germany ...... 425/270

Primary Examiner—James Derrington
Attorney, Agent, or Firm—Gravely, Lieder & Woodruff

[57] ABSTRACT

A dip mold for forming a part from plastisol which part has an integral internal member. The dip mold has an internal cavity in its free end to form said internal member and the cavity is vented by a lateral passage to the outside face of the mold to allow air in the cavity to escape and the internal molded part to be formed.

4 Claims, 7 Drawing Figures

FIG. 1
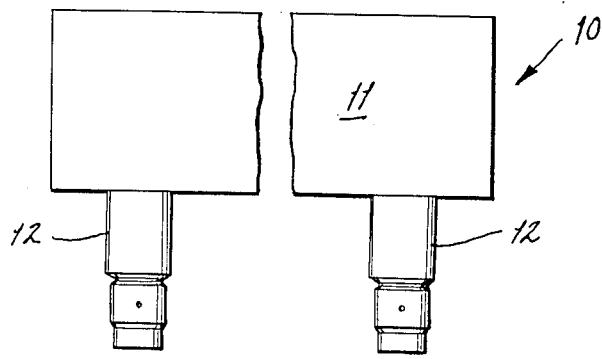
FIG. 2
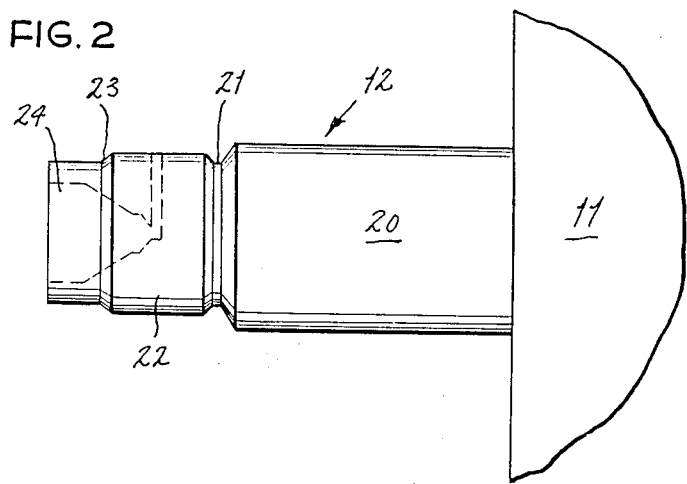
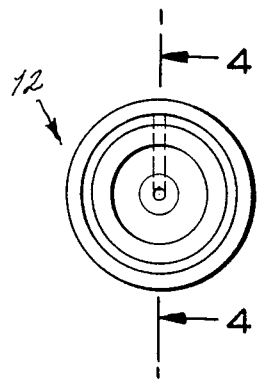
FIG. 3
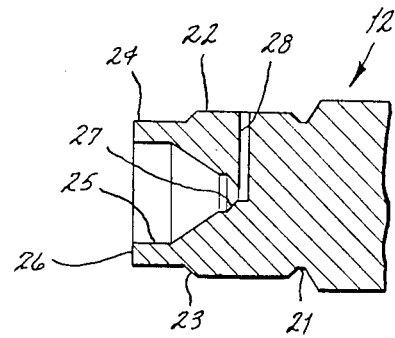
FIG. 4

DIP MOLD AND PROCESS

BACKGROUND OF THE INVENTION

This invention relates to the field of hot dip molding and specifically relates to a dip mold having an internal air vent to allow plastisol to form a full internal part on the molded object. The invention also relates to a dip molding process in which an internal part is formed while air trapped in the mold is released through the mold.

Conventionally, when using a hot dipping process, a heated mandrel is dipped into a plastisol so that the heat from the mandrel causes the surrounding plastisol to jel on the mandrel. The mandrel is then withdrawn from the plastisol at a slow steady rate to prevent runs and drips. The mandrel with the jelled plastisol thereon is then post-baked in a forced air oven or in a bath of molten salt or other non-compatible oils to cure the plastisol. After a predetermined time the mandrel is taken out of the post-bake medium and either air cooled or water cooled after which the plastisol part is stripped from the mandrel.

When the part to be molded has an internal part so that the plastisol must move into an external cavity to form the internal part, there is air in the cavity which resists the movement of the plastisol into the cavity. As plastisol moves into the cavity the air tends to be compressed, thus increasing resistance to flow of plastisol into said cavity.

I have found that by forming a small lateral passage from the depths of the cavity through the side wall of the mold, the air will escape into the passage and allow a full internal part to be formed on the molded item. The size of the passage is small enough that the plastisol does not enter it, so that the outer wall of the molded internal part is smooth.

Accordingly, it is a principal object of this invention to provide a dip mold and process in which an object is molded with a complete internal part.

It is another important object to provide a dip molding process in which the dip mold has an internal cavity on its outer end to form an internal molded part on the object to be molded, and the dip mold is provided with a lateral passage connecting the innermost part of the internal cavity with the outer side wall of the mold to allow air to escape from the cavity.

These and other objects and advantages will become apparent hereinafter.

SUMMARY OF THE INVENTION

The present invention comprises a dip mold and process in which air is released from an exterior cavity on a dip mold so that plastisol will fill the cavity during dip molding to form a complete internal part on the molded object.

DESCRIPTION OF THE DRAWINGS

In the drawings, wherein like numbers refer to like parts wherever they occur,

FIG. 1 is a fragmentary representation of a mandrel with dip molds thereon;

FIG. 2 is an enlarged side elevational view of an individual dip mold with the internal cavity and air vent shown in broken lines;

FIG. 3 is an elevational view of the dip mold of FIG. 2;

FIG. 4 is a fragmentary sectional view taken along line 4—4 of FIG. 3;

DETAILED DESCRIPTION

Figure 5:
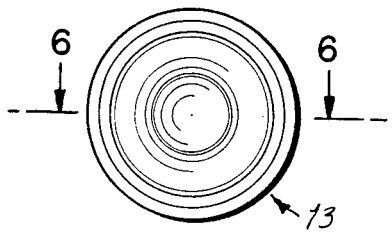
FIG. 5 is an end elevational view of a part molded on the dip mold of FIG. 2.
Figure 6:
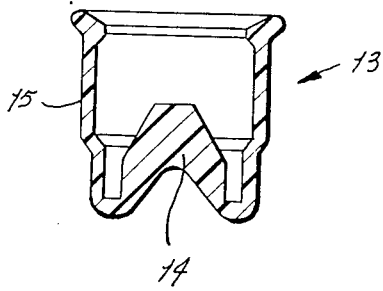
FIG. 6 is a sectional view taken along line 6—6 of FIG. 5.

FIG. 1 shows a mold mandrel 10 which comprises a body portion 11 and a series of dip molds 12 attached thereto. The molds 12 have the shape of the objects to be molded, and FIGS. 5 and 6 show a typical part 13 formed according to this invention. The part 13 is characterized by an internal member 14 spaced from the outer side wall 15.

FIGS. 2, 3 and 4 show the mold 12 in greater detail. The mold 12 has a shank portion 20 which connects to the mandrel body 11. A necked down area 21 connects a main cylindrical body 22 to the shank 20. A conical shoulder 23 connects an end cylinder 24 to main body 22. An internal cavity 25 opens to the free end 26 of the end cylinder 24 and at its innermost portion 27 connects to a lateral passage way 28 which connects the internal cavity 25 to the main cylindrical body 22 (FIG. 4).

It is the internal cavity 25 where the molded part internal member 13 is formed. The problem encountered in present dip molds is that air pressure builds up inside the cavity 25 when the mold 12 is dipped into a vat of plastisol so that the internal member 13 is foreshortened or otherwise distended or incomplete. By providing the air escape passage 28, the air is forced out of the cavity 25 through the passage 28 to allow the inner walls of the cavity 25 to be completely coated with plastisol up to the innermost portion 27, thus forming a complete part member 14. Since the passage 28 is substantially at right angles to the innermost portion of the cavity 27, the plastisol does not close the end of the passage 28 until the internal part 14 is completely formed.

Figure 7:
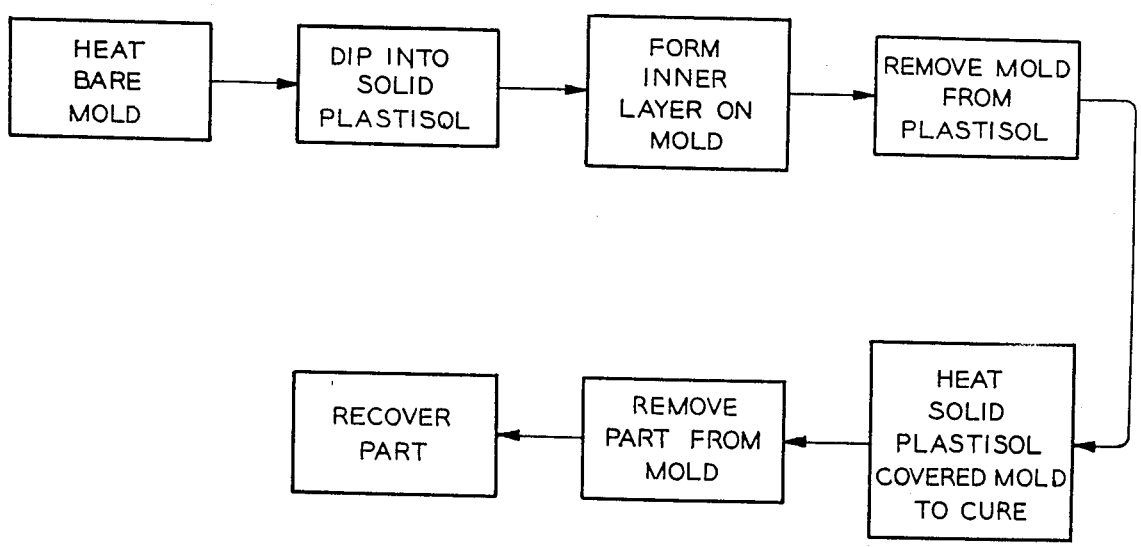
FIG. 7 is a schematic flow diagram of the process embodied in the present invention.

In the process of this invention as illustrated in the flow diagram shown in FIG. 7, the mold mandrel 10 first is heated preferably to a temperature of about 320° F. to about 360° F., and then dipped into a vat of plastisol. A typical such plastisol is polyvinylchloride which is commercially available from many sources.

The heated mandrel is allowed to remain in the plastisol for about 10 to about 30 seconds, whereby the plastisol jels on the mandrel to a thickness of about 0.050 to about 0.080 inches. The mandrel then is slowly and carefully withdrawn from the plastisol so as to minimize dripping and running of the plastisol which could form an imperfect outer surface which would not cure at a uniform rate. The plastisol covered mandrel then is cured at a temperature of about 410° F. to about 450° F. for about 3 minutes to about 7 minutes.

The final step is to cool the plastisol part in air or water and then strip the finished part from the mandrel for storage or packing.

This invention is useful for making end covers for automotive and electrical parts, to protect threads, ports, studs, shafts, grips for tool handles, bicycle handles, etc.

This invention is intended to cover all modifications and improvements to the invention described and claimed.

What is claimed is:

1. A one piece dip mold having a longitudinal body with an outer wall and an internal cavity open at one end and vent passage means extending laterally from the internal cavity to the outer wall of the mold.

2. The dip mold of claim 1 wherein the longitudinal body is connected at one end to a mold mandrel and has a second free end extending away from the mandrel, the said open end of said internal cavity being at the said free end and the cavity extends inwardly longitudinally into said body.

3. The dip mold of claim 2 wherein the said vent passage means connects to the cavity at its innermost terminus in the body.

4. A dip mold having a longitudinal body having an outside wall and an internal longitudinal cavity open at one end of said body and vent passage means venting the internal cavity to the outside wall of the mold, the vent passage extending laterally with respect to the center line of the cavity from the terminus of the cavity to the outside wall of the mold.

* * * * *